3,395,145
2-ARYL-1-OXA-3-AZASPIRO[5,5]UNDEC-2-ENES
Holger V. Hansen, Morris Plains, Sylvester Klutchko, Hackettstown, and Robert I. Meltzer, Rockaway, N.J., assignors to Warner-Lambert Pharmaceutical Company, Morris Plains, N.J., a corporation of Delaware
No Drawing. Filed Aug. 17, 1966, Ser. No. 572,884
6 Claims. (Cl. 260—244)

ABSTRACT OF THE DISCLOSURE

This invention relates to 2-aryl-1-oxa-3-azaspiro[5,5]undec-2-enes of the formula:

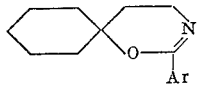

wherein Ar is phenyl, furyl, pyridyl and the like, and the corresponding acid or quaternary salt thereof. The compounds of this invention are useful as antimicrobial agents and are particularly effective against fungus such as *Candida albicans*.

---

This invention relates to 2-aryl-1-oxa-3-azaspiro[5,5]undec-2-enes of the formula:

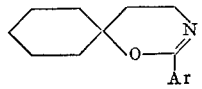

wherein Ar is an aromatic radical, for example, a monohomocyclic radical such as phenyl or monoheterocyclic radical such as furyl, pyridyl, and the like.

The aromatic radical may also be mono-, di- or trisubstituted with groups such as lower alkyl of 1 to 6 carbon atoms, lower alkoxy such as ethoxy, methoxy, propoxy and the like; nitro, amino, halogen and the like.

The present invention also includes within its scope the non-toxic pharmaceutically acceptable acid addition salts and quaternary salts of the above compounds, as well as various pharmaceutical dosage forms containing the subject compounds or their salts as active ingredients.

The compounds of this invention are useful as antimicrobial agents. They are particularly effective against fungus such as *Candida albicans*.

In use the above compounds either in the form of the free bases or the corresponding acid addition salts or quaternary salts may be combined with an inert diluent such as talc or petrolatum to form dusting powder or ointments suitable for topical application. Generally speaking, the active ingredient is present from about 0.5 to about 1% by weight.

According to the process of this invention, the above compounds are prepared by condensing 2-(cyclohexen-1-yl)ethylamine with an aromatic acid or a suitable derivative of such acid such as the corresponding acid chloride or acid anhydride to yield compound II. This reaction may be effected at a temperature of about 10° C. to about 70° C. The resulting compound has the formula:

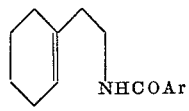

Treatment of the amide II with a condensing agent such as a mineral acid, preferably polyphosphoric acid, at elevated temperatures such as from about 75 to 125° C. for a period of about 45 to 150 minutes yields a compound of this invention having the formula:

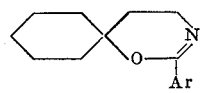

The compound can be recovered from the reaction mixture by dilution of the mixture with water followed by basification with an alkali. The reaction product is then extracted into a water imiscible solvent such as ether. The product may then be converted to the corresponding acid addition salts or quaternary salts.

The compounds of this invention may be converted into their pharmaceutically acceptable non-toxic acid addition and quaternary ammonium salts by conventional procedures. Exemplary of non-toxic acid addition salts are those formed with maleic, fumaric, succinic, tartaric, citric, malic, cinnamic, hydrochloric, hydrobromic, sulfuric, phosphoric and nitric acids. The acid addition salts may be prepared in the conventional manner, by treating a solution or suspension of the free base in an organic solvent with the desired acid, and then recovering the salt which forms by crystallization techniques. The quaternary salts are prepared by heating a suspension of the free base in a solvent with a reactive halide such as methyl iodide, ethyl bromide, n-hexyl bromide, benzyl chloride or a reactive ester such as methyl sulfate, ethyl sulfate or methyl p-toluenesulfonate.

The following examples are included in order further to illustrate the invention. All temperatures are given in degrees centigrade.

EXAMPLE 1

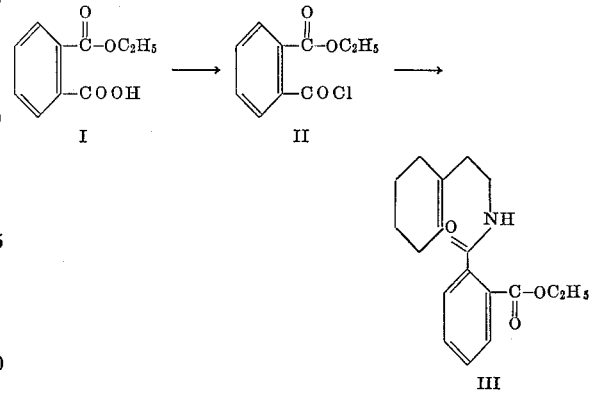

o-Carbethoxy-N-[2-(cyclohexen-1-yl)ethyl]benzamide (III)

Preparation of the acid chloride (II).—A solution of 42.7 g. (0.22 mole) of ethyl acid phthalate (I) and 200 ml. of thionyl chloride is heated at reflux for one hour. Removal of all the excess thionyl chloride by distillation gives the crude viscous acid chloride (II). This material is used as such in the next step.

Preparation of amide (III).—A solution of the crude acid chloride (II) in 200 ml. of methylene chloride is added over a period of ten minutes to a vigorously stirred mixture of 27.7 g. (0.23 mole) of 2-(cyclohexen-1-yl)ethylamine, 60 g. of potassium carbonate, 200 ml. of water and 200 ml. of methylene chloride at a temperature of 10 to 20° C. The reaction mixture is then stirred at 20 to 30° C. for two hours. The organic phase is separated, washed with 500 ml. of water, 500 ml. of 1 N hydrochloric acid and then with 500 ml. of water. After drying (potassium carbonate) and evaporating the solvent, there is obtained 54 g. (82%) of amide, M.P. 85–90° C. Recrystallization from ethyl acetate-petroleum ether gives pure white amide melting at 90–91° C.

Analysis for $C_{18}H_{23}NO_3$: Calcd. C, 71.73; H, 7.69; N, 4.65. Found: C, 71.93; H, 7.71; N, 4.54.

EXAMPLE 2

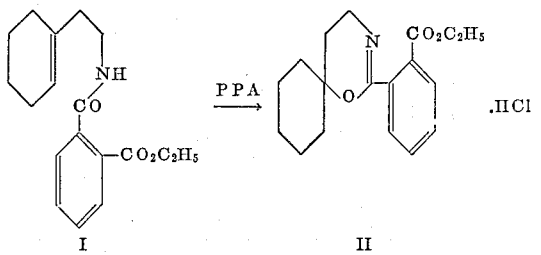

2-(o-ethoxycarbonylphenyl)-1-oxa-3-azaspiro[5,5] undec-2-ene hydrochloride

A mixture of 50 g. (0.17 mole) of o-carbethoxy-N-[2-(cyclohexen-1-yl)ethyl]benzamide and 350 g. of polyphosphoric acid is heated with stirring for 5 minutes at 90° on the steam bath. This hot solution is poured directly into 1 l. of ice water and the resulting aqueous mixture is extracted with ether to remove some acid-insoluble material. The oxazine base is liberated from the acid solution by cautious basification, with good cooling, first with 10 N potassium hydroxide and finally with saturated potassium carbonate solution. The base is extracted into 1 l. of ether and the ether, after drying (potassium carbonate), is evaporated to leave 47 g. (94%) of the oxazine ester II as a colorless viscous oil, suitable for further reactions. A small sample is distilled to give a center cut of analytically pure material with B.P. 150–155°/0.05 mm.;

$\lambda_{max.}^{EtOH}$ m$\mu$($\epsilon$) 218 sh (12,600), 275 (1220) and 299 sh (220); $\nu$ film 1730 (C=O), 1660 (C=N) cm.$^{-1}$.

Analysis for $C_{18}H_{23}NO_3$: Calcd. C, 71.93; H, 7.71; N, N, 4.65. Found: C, 71.93; H, 7.71; N, 4.54.

The hydrochloride is prepared by treatment of an ether solution of 3.2 g. of the base with a slight excess of hydrogen chloride. The salt, an oil, is crystallized from ethyl acetate-ether, M.P. 103–104°. One further recrystallization from 2-propanol-ethyl acetate gives an analytical sample, M.P. 103–104°;

$\lambda_{max.}^{EtOH}$ m$\mu$($\epsilon$) 229 (8720), 273 (1680) and 280 (1600).

$\nu$ Nujol 2400 (NH$^+$), 1710 (C=O), 1675 (C=N$^+$) cm.$^{-1}$.

Analysis for $C_{18}H_{23}NO_3 \cdot HCl$: Calcd. C, 64.00; H, 7.16; N, 4.15; Cl, 10.49. Found: C, 63.95; H, 7.08; N, 4.39; Cl, 10.76.

EXAMPLE 2-A

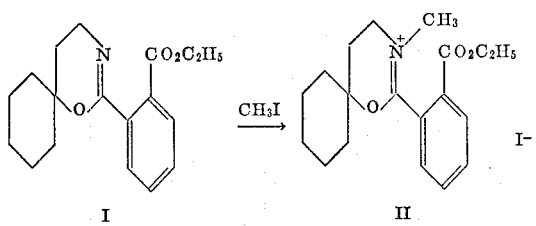

2-(o-ethoxycarbonylphenyl)-1-oxa-3-azaspiro[5,5] undec-2-ene methiodide

A solution of 16 g. of the crude oxazine base (I) in 400 ml. of ether is treated with 40 ml. of methyl iodide and allowed to stand, in the dark, at 20 to 30° C. for about three days. The separated solid is then filtered to give 23.5 g. (92%) of the crude methiodide II, M.P. 119–124°. Two recrystallizations from ethyl acetate give the analytically pure salt II, M.P. 126–8° as colorless crystals;

$\lambda_{max.}^{EtOH}$ m$\mu$($\epsilon$) 216 (14,300), 274 (1975) and 281 (1570);

$\nu$ Nujol 1715 (C=O), 1675 (C=N$^+$)cm.$^{-1}$.

Analysis for $C_{19}H_{26}NO_3I$: Calcd. C, 51.49; H, 5.91; N, 3.16. Found: C, 51.67; H, 6.06; N, 3.34.

EXAMPLE 3

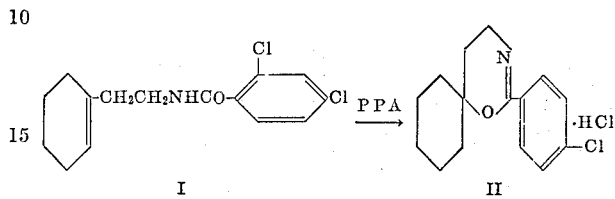

2-(2,4-dichlorophenyl)-1-oxa-3-azaspiro[5,5]undec-2-ene hydrochloride

A mixture of 18 g. (0.06 mole) of N-[2-(cyclohexen-1-yl)ethyl]-2,4-dichlorobenzamide (I) and ca. 100 g. of polyphosphoric acid is heated on the steam bath at 90° for 5 minutes, whereupon nearly all the solid goes into solution. The cooled mixture is diluted with 400 ml. of water and extracted with ether to remove unchanged starting material. The aqueous solution is then neutralized with ammonium hydroxide and basified with saturated potassium carbonate solution. The resulting oil is extracted into ether and the ether solution, after drying over potassium carbonate, is treated with excess hydrogen chloride and filtered to give 13.8 g. (68%) of the crude salt II, M.P. 118–120°. Recrystallization from 2-propanol-ether furnishes analytically pure spiroxazine hydrochloride (II), M.P. 118–120°;

$\lambda_{max.}^{EtOH}$ m$\mu$($\epsilon$) 226 sh (9500) with decreasing absorption to 300, $\nu$ Nujol 2500 (NH$^-$), 1670 (C=N$^+$)cm.$^{-1}$ Analysis for $C_{15}H_{17}NOCl_2 \cdot HCl$: Calcd. C, 53.83; H, 5.42; N, 4.19. Found: C, 53.98; H, 5.48; N, 4.06.

EXAMPLE 4

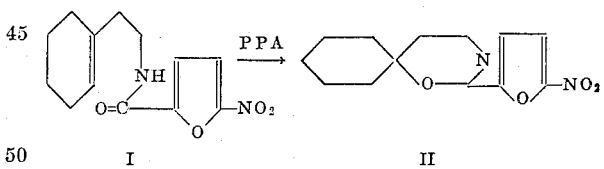

2-(5-nitro-2-furyl)-1-oxa-3-azaspiro[5,5]undec-2-ene hydrochloride

A mixture of 8.0 g. (0.03 mole) of the amide (I) and 50 g. of polyphosphoric acid is heated with stirring at 100° for five minutes. The cooled reaction solution is dissolved in 500 ml. of water, keeping the temperature <30° by cooling. The dark solution is charcoaled, filtered and neutralized (to pH 6–7) with 10 N potassium hydroxide using efficient cooling. Excess saturated potassium carbonate is added and the separated product is extracted into 800 ml. of ether. The hydrochloride salt is prepared directly from the dried (potassium carbonate) ether solution by treating it with excess hydrogen chloride gas. The crude salt melts at 98–100°. Recrystallization is accomplished by dissolving the crude in a minimum amount of methanol at 20 to 30° C. and adding ether until turbid. The pure pale yellow crystals melt at 103–105° C.;

$\lambda_{max.}^{MeOH}$ m$\mu$ ($\epsilon$) 370 (14,000), 453 (13,400), $\nu$ Nujol 1660 (C=N$^+$) cm.$^{-1}$.

Analysis for $C_{13}H_{16}N_2O_4 \cdot HCl$: Calcd. C, 51.92; H, 5.70; N, 9.31. Found: C, 51.63; H, 5.52; N, 9.26.

EXAMPLE 5

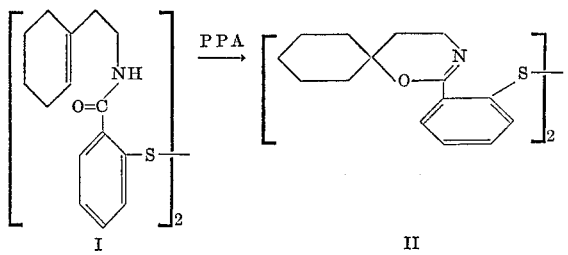

2,2'-(dithiodi-o-phenylene)bis[1-oxa-3-azaspiro[5,5]undec-2-ene]

A mixture of 8.0 g. (0.15 mole) of the amide (I) and 50 g. of polyphosphoric acid is heated with stirring at 100° for ten minutes. The solution is added to 500 ml. of cold water with stirring. The insoluble white amorphous solid (II phosphate) is filtered, washed with water and dissolved in 150 ml. of methanol. To prepare the base, there is added first a solution of 50 ml. of methanol and 20 ml. of 10 N potassium hydroxide and then 500 ml. of water. The solid base is filtered, washed well with water and recrystallized from 500 ml. of 2-propanol to give pure II base melting at 170–171° C.;

$\lambda_{max.}^{EtOH}$ m$\mu$ ($\epsilon$) 219 (3260), 252 sh (1660), 300 (442); $\nu$ Nujol 1650 (C=N) cm.$^{-1}$.

Analysis for $C_{30}H_{36}N_2O_2S_2$: Calcd. C, 69.19; H, 6.97; N, 5.38. Found: C, 68.94; H, 7.05; N, 5.13.

EXAMPLE 6

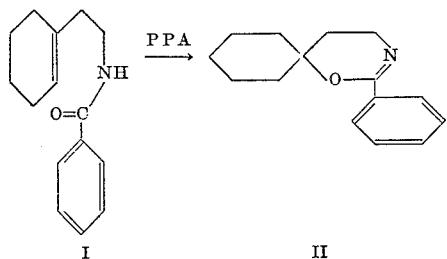

2-phenyl-1-oxa-3-azaspiro[5,5]undec-2-ene hydrochloride

A mixture of 19.0 g. (0.083 mole) of N-[2-(cyclohexen-1-yl)ethyl]benzamide and 100 g. of polyphosphoric acid is heated with stirring at 100° for 5 minutes. The hot solution is added to 500 ml. of cold water. The aqueous cooled solution is clarified, filtered, neutralized with 10 N potassium hydroxide with efficient cooling and finally treated with excess saturated potassium carbonate solution. The base is extracted into one liter of ether. The ether solution (after drying over potassium carbonate) is treated with excess hydrogen chloride to give 21 g. (96%) of the hydrochloride salt of II, M.P. 98–103°. Recrystallization from 2-propanol gives the purified product melting at 110–112° C.;

$\lambda_{max.}^{EtOH}$ m$\mu$ ($\epsilon$) 243 (12,500), $\nu$ Nujol 1660 (C=N$^+$) cm.$^{-1}$ Analysis for $C_{15}H_{19}NO \cdot HCl$: Calcd. C, 67.79; H, 7.58; N, 5.27; Cl, 13.34. Found: C, 68.30; H, 7.73; N, 5.36; Cl, 13.52.

It is understood that the foregoing detailed description is given merely by way of illustration and that many variations may be made therein without departing from the spirit of our invention.

Having described our invention, what we desire to secure by Letters Patent is:

1. A compound of the formula:

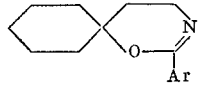

wherein Ar is phenyl, furyl or pyridyl and the corresponding acid addition salt formed with maleic, fumaric, succinic, tartaric, citric, malic, cinnamic, hydrochloric, hydrobromic, sulfuric, phosphoric or nitric acid or the corresponding quaternary ammonium salt prepared with methyl iodide, ethyl bromide, n-hexyl bromide, benzyl chloride, methyl sulfate, ethyl sulfate or methyl p-toluene sulfonate.

2. 2 - (o - ethoxycarbonylphenyl) - 1 - oxa - 3 - azaspiro[5,5]undec-2-ene and the corresponding acid addition salt formed with maleic, fumaric, succinic, tartaric, citric, malic, cinnamic, hydrochloric, hydrobromic, sulfuric, phosphoric or nitric acid or the corresponding quaternary ammonium salt prepared with methyl iodide, ethyl bromide, n-hexyl bromide, benzyl chloride, methyl sulfate, ethyl sulfate or methyl p-toluene sulfonate.

3. 2 - (2,4 - dichlorophenyl) - 1 - oxa - 3 - azaspiro[5,5]undec-2-ene and the corresponding acid addition salt formed with maleic, fumaric, succinic, tartaric, citric, malic, cinnamic, hydrochloric, hydrobromic, sulfuric, phosphoric or nitric acid or the corresponding quaternary ammonium salt prepared wih methyl iodide, ethyl bromide, n-hexyl bromide, benzyl chloride, methyl sulfate, ethyl sulfate or methyl p-toluene sulfonate.

4. 2 - (5 - nitro - 2 - furyl) - 1 - oxa - 3 - azaspiro[5,5]undec-2-ene and the corresponding acid addition salt formed with maleic, fumaric, succinic, tartaric, citric, malic, cinnamic, hydrochloric, hydrobromic, sulfuric, phosphoric or nitric acid or the corresponding quaternary ammonium salt prepared with methyl iodide, ethyl bromide, n-hexyl bromide, benzyl chloride, methyl sulfate, ethyl sulfate or methyl p-toluene sulfonate.

5. 2,2' - (dithiodi - o - phenylene)bis[1 - oxa - 3 - azaspiro[5,5]undec-2-ene] and the corresponding acid addition salt formed with maleic, fumaric, succinic, tartaric, citric, malic, cinnamic, hydrochloric, hydrobromic, sulfuric, phosphoric or nitric acid or the corresponding quaternary ammonium salt prepared with methyl iodide, ethyl bromide, n-hexyl bromide, benzyl chloride, methyl sulfate, ethyl sulfate or methyl p-toluene sulfonate.

6. 2 - phenyl - 1 - oxa - 3 - azaspiro[5,5]undec - 2 - ene and the corresponding acid addition salt formed with maleic, fumaric, succinic, tartaric, citric, malic, cinnamic, hydrochloric, hydrobromic, sulfuric, phosphoric or nitric acid or the corresponding quaternary ammonium salt prepared with methyl iodide, ethyl bromide, n-hexyl bromide, benzyl chloride, methyl sulfate, ethyl sulfate or methyl p-toluene sulfonate.

References Cited

Grewe et al., Chem. Ber., vol. 84, pages 527–31 (1951).

JOHN D. RANDOLPH, *Primary Examiner.*

NATALIE TROUSOF, *Assistant Examiner.*